US00RE50169E

(19) United States
(12) Reissued Patent
Baker et al.

(10) Patent Number: US RE50,169 E
(45) Date of Reissued Patent: Oct. 15, 2024

(54) DISPLAY SCREEN OR PORTION THEREOF WITH GRAPHICAL USER INTERFACE

(71) Applicant: Lutron Technology Company LLC, Coopersburg, PA (US)

(72) Inventors: Rhodes B. Baker, Bethlehem, PA (US); Erica L. Clymer, Northampton, PA (US); Benjamin F. Bard, Zionsville, PA (US)

(73) Assignee: Lutron Technology Company LLC, Coopersburg, PA (US)

(21) Appl. No.: 29/898,364

(22) Filed: Jul. 26, 2023

Related U.S. Patent Documents

Reissue of:
(64) Patent No.: Des. 772,910
Issued: Nov. 29, 2016
Appl. No.: 29/519,785
Filed: Mar. 8, 2015

U.S. Applications:
(63) Continuation of application No. 29/852,644, filed on Sep. 8, 2022, now Pat. No. Re. 49,638, which is a continuation of application No. 29/778,455, filed on Apr. 13, 2021, now Pat. No. Re. 49,264, which is a continuation of application No. 29/671,750, filed on Nov. 29, 2018, now Pat. No. Re. 48,567, which is an application for the reissue of Pat. No. Des. 772,910.

(51) LOC (14) Cl. ..... 14-04
(52) U.S. Cl.
USPC ..... D14/486
CPC ..... *G06F 3/048* (2013.01)
(58) Field of Classification Search
USPC ..... D14/485–495; D18/26, 31, 32, 33; D20/11, 12, 23, 24, 25, 29, 30, 31, 32, D20/36, 37, 38
CPC ..... G06F 3/048; G06F 3/0481; G06F 3/0482; G06F 3/04817; G06F 3/04812
See application file for complete search history.

(56) References Cited

U.S. PATENT DOCUMENTS

| | | | | |
|---|---|---|---|---|
| D429,252 | S | 8/2000 | Haitani et al. | |
| 6,100,659 | A | 8/2000 | Will et al. | |
| D546,779 | S * | 7/2007 | Mierta | D13/164 |
| D592,225 | S * | 5/2009 | Blankenship | D14/492 |
| 7,587,683 | B2 * | 9/2009 | Ito | H04M 1/72469 715/857 |

(Continued)

OTHER PUBLICATIONS

Crestron Electronics Inc., Prodigy System User Guide, available at least as early as Mar. 8, 2015.

(Continued)

*Primary Examiner* — Darlington Ly
(74) *Attorney, Agent, or Firm* — Saidman DesignLaw Group, LLC

(57) CLAIM

The ornamental design for a display screen or portion thereof with graphical user interface, as shown and described.

DESCRIPTION

*Notice: More than one reissue application has been filed for the reissue of Pat. No. D772,910. The reissue applications are Ser. No. 29/852,644, Ser. No. 29/778,455, and Ser. No. 29/671,750.*

The sole FIGURE is a display screen or portion thereof with graphical user interface showing our new design.

The peripheral dashed broken lines [represent] *depict* a display screen or portion thereof which forms no part of the claimed design.

1 Claim, 1 Drawing Sheet

Figure 1:
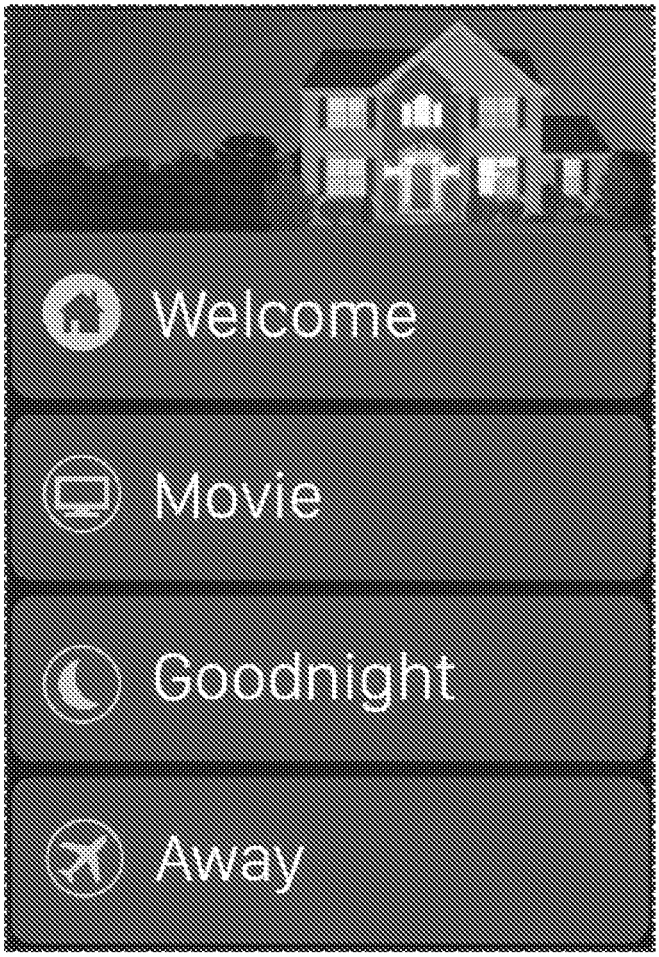

Matter enclosed in heavy brackets [ ] appears in the original patent but forms no part of this reissue; matter printed in italics indicates the additions made by reissue.

(NEW)

(56) References Cited

U.S. PATENT DOCUMENTS

D611,950 S * 3/2010 Fletcher ..... D14/488
D624,556 S * 9/2010 Chaudhri ..... D14/486
D640,267 S 6/2011 Jones et al.
D649,125 S * 11/2011 Clymer ..... D13/174
D659,158 S * 5/2012 Clymer ..... D14/488
D660,310 S * 5/2012 Kim ..... D14/486
D687,050 S * 7/2013 Matas ..... D14/486
D689,093 S 9/2013 Nagaoka et al.
8,525,839 B2 9/2013 Chaudhri
D695,313 S 12/2013 Jang et al.
D695,758 S * 12/2013 Tagliabue ..... D14/486
D696,272 S * 12/2013 Tagliabue ..... D14/486
D701,867 S 4/2014 Thompson et al.
D702,700 S * 4/2014 Thompson ..... D14/492
8,780,201 B1 * 7/2014 Scalisi ..... H04N 7/186 348/143
8,866,343 B2 * 10/2014 Abraham ..... H04L 12/413 307/85
D737,283 S * 8/2015 Scalisi ..... D14/485
D746,849 S * 1/2016 Anzures ..... D14/486
D748,645 S 2/2016 Kim et al.
D750,106 S 2/2016 Capela et al.
D753,706 S 4/2016 Xiong
D757,802 S * 5/2016 Kim ..... D14/491
D760,737 S * 7/2016 Yoon ..... D14/485
D761,292 S * 7/2016 Wiesner ..... D14/486
9,384,491 B1 * 7/2016 Briggs ..... H04W 4/44
D766,289 S 9/2016 Bauer et al.
D772,921 S 11/2016 Jewitt et al.
D773,485 S 12/2016 Cho et al.
D780,793 S * 3/2017 Lemay ..... D14/486
D783,631 S 4/2017 Inose et al.
D783,634 S 4/2017 Rounis
D794,669 S 8/2017 Baker et al.
D795,918 S 8/2017 Bischoff et al.
D795,926 S 8/2017 Bischoff et al.
D800,740 S 10/2017 Clymer et al.
D801,365 S * 10/2017 Broughton ..... D14/486
D802,013 S * 11/2017 Kluge ..... D14/488
D804,524 S 12/2017 Zin et al.
D809,560 S 2/2018 Alfonzo et al.
D830,409 S * 10/2018 Agarwal ..... D14/488
D838,290 S 1/2019 Clymer et al.
D847,174 S * 4/2019 Agarwal ..... D14/486
D849,050 S 5/2019 Clymer et al.
D854,036 S * 7/2019 Agarwal ..... D14/486
D866,588 S * 11/2019 Agarwal ..... D14/492
D873,847 S * 1/2020 Clymer ..... D14/487
D876,456 S * 2/2020 Broughton ..... D14/491
D891,458 S 7/2020 Clymer
D986,917 S 5/2023 Baker et al.
2010/0023865 A1 * 1/2010 Fulker ..... G08B 25/14 700/286
2011/0266122 A1 11/2011 Zaharchuk et al. ..... H01H 9/18 200/308
2012/0095601 A1 4/2012 Abraham et al.
2014/0236358 A1 8/2014 Sasaki et al.
2014/0380234 A1 * 12/2014 Shim ..... G06F 3/04842 715/781
2015/0033136 A1 * 1/2015 Sasaki ..... H04L 41/22 715/736
2015/0188724 A1 * 7/2015 Kim ..... H04N 7/181 340/3.71
2015/0286388 A1 * 10/2015 Jeon ..... G06F 3/04847 715/736
2016/0092959 A1 3/2016 Gross
2016/0262235 A1 9/2016 Clymer et al.
2020/0077483 A1 3/2020 Agarwal et al.

OTHER PUBLICATIONS

Lutron Electronics Co., Inc., Icons from Caseta (Q2 2014) App, available at least as early as Jun. 23, 2015.
Lutron Electronics Co., Inc., Icons from Saltmarsh/ myOrders (Q4 2015-Q3 2016) App, available at least as early as Jun. 23, 2015.
Lutron Electronics Co., Inc., Icons from Lutron Connect (Apr. 2016) App, available at least as early as Jun. 23, 2015.
Michael Brown, Lutron's Caseta lighting controls are now (mostly) compatible with Apple's HomeKit, dated Jun. 2, 2015, TechHive.com [online], [retrieved Feb. 6, 2017]. Available from Internet: <URL: http://www.techhive.com/article/2929733/lutrons-caseta-lighting-controls-are-now-mostly-compatible-with-apples-homekit.html>.
Home Automation Smart Home Icon Set, dated Jul. 25, 2014, graphicriver.net [online], [retrieved Sep. 29, 2018]. Available from Internet: <URL: https://graphicriver.net/item/home-automation-smart-home-icon-set/8389579>.
Grant Clauser, Lutron's New Smart Bridge Pro Makes Lutron Lighting Easier to Integrate, dated Apr. 8, 2014, electronichouse.com [online], [retrieved Feb. 16, 2018]. Available from Internet: <URL: https://www.electronichouse.com/home-lighting/>.
Blue Link, dated Nov. 6, 2017, neosmartblinds.com [online]. Retrieved Aug. 31, 2020 from Internet <URL: https://web.archive.org/web/20171106121500/http://neosmartblinds.com/bluelink/> (Year: 2017).
Lutron Electronics Co., Inc., Icons from HomeControl+ (Q3 2014) App, available at least as early as Aug. 4, 2015.
Lutron Electronics Co., Inc., Icons from Quantum Vue (Q1 2014) App, available at least as early as Aug. 4, 2015.
Lutron Electronics Co., Inc., Icons from Apple Watch (Q3 2014) App, available at least as early as Aug. 4, 2015.
Lutron Electronics Co., Inc., Icons from Vive (Q3 2016) App, available at least as early as Aug. 4, 2015.
Lutron Technical Support, RadioRA2—Lutron Home Control+ App for the Apple iPad, iPhone, and iPod touch, Lutron Home Control+ App for Android, Revision I, available at least as early as 2011.
Crestron Electronics Inc., Crestron Mobile E-Control Mobility Solution, available at least as early as Mar. 2009.
Crestron Electronics Inc., Prodigy System User Guide Crestron $PTX_3$, available at least as early as Mar. 8, 2015.
Julie Jacobson, CEPro $Control_4$ InfinityEdge Priced, Designed Like iPad, < http://www.cepro.com/article/control4_infinityedge_priced_designed_like_ipad/ >, available on Aug. 10, 2010.
Lutron Technical Support, $RadioRA_2$—Lutron Home Control+ App for the Apple iPad, iPhone, and iPod touch, Revision F, available at least as early as Mar. 8, 2015.
Lutron Electronics Co., Inc., Quantum Green Glance Brochure, available at least as early as Nov. 2007.
Home Automation, Inc., OmniTouch 5.7 Touchscreen with Video User's Guide, available at least as early as Jun. 2007.
Crestron Electronics Inc., Prodigy Brochure, available at least as early as Mar. 8, 2015.

* cited by examiner

*(CANCELED)*